（12）United States Patent
Miyazaki et al.

(10) Patent No.: US 10,493,886 B2
(45) Date of Patent: Dec. 3, 2019

(54) SEAT PROVIDED WITH ARMREST

(71) Applicants: TS TECH CO., LTD., Asaka-shi, Saitama (JP); HONDA MOTOR CO., LTD., Tokyo (JP)

(72) Inventors: Masayuki Miyazaki, Tochigi (JP); Toru Inagaki, Saitama (JP); Toshihiko Tsuda, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 15/564,822

(22) PCT Filed: Apr. 13, 2016

(86) PCT No.: PCT/JP2016/061918
§ 371 (c)(1),
(2) Date: Oct. 6, 2017

(87) PCT Pub. No.: WO2016/167288
PCT Pub. Date: Oct. 20, 2016

(65) Prior Publication Data
US 2018/0118069 A1    May 3, 2018

(30) Foreign Application Priority Data

Apr. 14, 2015    (JP) ................................. 2015-082866

(51) Int. Cl.
*B60N 2/75*    (2018.01)
*A47C 7/54*    (2006.01)
*B60N 2/68*    (2006.01)

(52) U.S. Cl.
CPC ............... *B60N 2/757* (2018.02); *A47C 7/54* (2013.01); *A47C 7/543* (2013.01); *B60N 2/682* (2013.01); *B60N 2/75* (2018.02)

(58) Field of Classification Search
CPC .. B60N 2/757; B60N 2/75; A47C 7/54; A47C 7/543
(Continued)

(56) References Cited

U.S. PATENT DOCUMENTS 4,848,840 A * 7/1989 Toya ...................... B60N 2/753
                                                              297/411.32
4,953,259 A * 9/1990 Frye ........................ E05D 11/06
                                                              16/225
(Continued)

FOREIGN PATENT DOCUMENTS

JP    S62-113751 U    7/1987
JP    H09-065951 A    3/1997
(Continued)

OTHER PUBLICATIONS

Extended European Search Report issued in related application EP 16780079.6, dated Mar. 5, 2018, 7 pages.

*Primary Examiner* — Gary C Hoge
(74) *Attorney, Agent, or Firm* — Drinker Biddle & Reath LLP

(57) ABSTRACT

The present disclosure describes, in an armrest capable of being displaced between a stored position and a deployed position, a vehicular seat capable of preventing foreign matter from entering the interior thereof through a gap formed between the armrest (in particular, the vicinity of the center of displacement thereof) and a mounted portion. The present disclosure relates to a vehicular seat provided with an armrest. Both ends of a first shaft are pivotably supported by first holes formed in a plurality of guide members, and both ends of a second shaft are inserted into second holes to be movable along the holes. Between a side surface side of the armrest and the guide members, a plate member which covers at least a part of the second holes is provided.

20 Claims, 13 Drawing Sheets

(58) Field of Classification Search
USPC .......................................... 297/411.32, 411.3
See application file for complete search history.

(56) References Cited

U.S. PATENT DOCUMENTS

| | | | | |
|---|---|---|---|---|
| 5,292,171 A * | 3/1994 | Harrell | ................... | B60N 2/757 |
| | | | | 297/113 |
| 5,669,107 A * | 9/1997 | Carlsen | ................ | E05D 11/082 |
| | | | | 16/348 |
| 5,752,739 A * | 5/1998 | Saeki | .................... | B60N 2/757 |
| | | | | 297/113 |
| 5,938,280 A * | 8/1999 | Hoshino | ................ | B60N 2/753 |
| | | | | 297/216.13 |
| 6,328,384 B1 * | 12/2001 | Yamauchi | ............. | B60N 2/753 |
| | | | | 297/411.29 |
| 8,827,369 B2 | 9/2014 | Izawa et al. | | |
| 2003/0085604 A1 * | 5/2003 | Ozawa | .................. | B60N 2/757 |
| | | | | 297/378.1 |
| 2006/0071529 A1 * | 4/2006 | Yetukuri | ................ | B60N 2/757 |
| | | | | 297/411.32 |
| 2009/0167070 A1 * | 7/2009 | Chen | ...................... | B60N 2/753 |
| | | | | 297/411.32 |
| 2011/0115275 A1 * | 5/2011 | von Rothkirch und Panthen | ....... | |
| | | | | B60N 2/77 |
| | | | | 297/411.32 |
| 2011/0156464 A1 * | 6/2011 | Izawa | ...................... | A47C 7/54 |
| | | | | 297/411.31 |
| 2012/0223564 A1 * | 9/2012 | Andersson | ............. | B60N 2/787 |
| | | | | 297/411.3 |
| 2017/0305309 A1 * | 10/2017 | Akai | ...................... | B60N 2/682 |
| 2018/0065520 A1 * | 3/2018 | Aktas | ..................... | B60N 2/757 |
| 2018/0334069 A1 * | 11/2018 | Tsuchiya | ............... | B60N 2/757 |

FOREIGN PATENT DOCUMENTS

| | | |
|---|---|---|
| JP | H09-084658 A | 3/1997 |
| JP | 2002-306275 A | 10/2002 |
| JP | 2008-049755 A | 3/2008 |
| JP | 2010-221939 A | 10/2010 |
| JP | 2012-051492 A | 3/2012 |

\* cited by examiner

SEAT PROVIDED WITH ARMREST

CROSS REFERENCE TO RELATED APPLICATIONS

This application is a National Stage Entry application of PCT Application No. PCT/JP2016/061918, filed Apr. 13, 2016, which claims the priority benefit of Japanese Patent Application No. JP 2015-082866, filed Apr. 14, 2015, the contents being incorporated herein by reference.

BACKGROUND

The present disclosure relates to a seat provided with an armrest and, more specifically, to a seat provided with an armrest which is designed to be capable of being deployed and stored with respect to the seat.

In a vehicle such as an automobile, a vehicular seat on which an occupant is seated is disposed, and such a vehicular seat is often provided with an armrest. In order to improve the convenience of an occupant, such an armrest is sometimes capable of being moved between a stored position and a deployed (usage) position.

For example, in Japanese Patent Publication JP 2002-306275 and Japanese Patent Publication JP 2008-049755, an armrest is provided in a central portion of a rear seat. These armrests are configured to be capable of being displaced between a stored position where the armrest is stored along a seat back (that is, it is disposed to rise in an up and down direction) and a usage (deployed) position where the armrest is deployed in a position substantially perpendicular to the seat back. This displacement is performed by pivoting the armrest around one end (which is a lower end side at the time of storage and is a rear end side at the time of deployment) of the armrest as a fulcrum. That is, the one end side (which is the lower end side at the time of storage and is the rear end side at the time of deployment) of the armrest is rotatably supported to be pivotable with respect to the seat back, and a free end side (which is an upper end side at the time of storage and is a front end side at the time of deployment) is pivoted, thus drawing a circular arcuate locus around the one end side, thereby being displaced between the stored position and the usage (deployed) position. Then, in the seat back, a recessed portion in which the armrest can be stored at the time of storage of the armrest is formed, or a gap between the rear seats divided into two parts serves as a storage space of the armrest.

As thus described, although the armrest which is formed to be capable of being displaced between the stored position and the usage (deployed) position is used for the vehicular seat, the armrest is configured to be pivoted about the one end side as a pivot center, and therefore there was a possibility that foreign matter enters the interior in the vicinity of the pivot portion. That is, in the vicinity of the pivot center, a pivot shaft, a bearing member and the like are disposed, but there is a possibility that foreign matter enters the vicinity of these members from a small gap formed between a side surface of the armrest and a side wall of a storage portion, thus a technique for preventing this possibility has been demanded. Moreover, a technique for which a time point when displacement between the stored position and the usage (deployed) position is completely finished is recognizable by an operational feeling is demanded at the same time.

SUMMARY

An embodiment of the present disclosure solves the above problems and provides, in an armrest capable of being displaced between a stored position and a deployed position, a seat provided with an armrest capable of preventing foreign matter from entering the interior thereof through a gap formed between the armrest (in particular, the vicinity of the center of displacement thereof) and a mounted portion. Moreover, an embodiment of the present disclosure provides, in an armrest capable of being displaced between a stored position and a deployed position, a seat provided with an armrest for which a displacement completion point to each position is recognizable.

In accordance with an embodiment of a seat provided with an armrest according to the present disclosure, the above problems are solved by a seat provided with an armrest which is pivotally displaced around one end side between a stored position where it is retracted in a posture along a seat back and a deployed position where it is deployed to a position where a free end side projects forwardly from the seat back, in which: on the one end side of the armrest, a first shaft configured as a pivot center is disposed to pass through in a width direction of the seat, and a second shaft passes through the one end side substantially parallel to the first shaft; the first shaft is pivotably supported by a first hole formed in a guide member fixed to a seat back frame which is a framework of the seat back, and the second shaft is inserted into an elongated second hole formed along a partial circular arc locus around the first hole to be movable along the second hole; and between a side surface side of the armrest and the guide member, a plate member which covers at least a part of the second hole is provided.

As thus described, in the present disclosure, in order to pivotably mount the armrest, the first shaft and the second shaft are projected from one end of the armrest, and these projection ends are rotatably supported on a skeleton side (which is the guide member fixed to the seat back frame, in the present disclosure). Then, the armrest pivots around this pivot center shaft, and by such a configuration, a gap is formed between the guide member and the side surface of the armrest. However, in the present disclosure, the plate member is interposed between the guide member and the side surface of the armrest, the second hole portion through which the second shaft passes is covered, and foreign matter can be effectively prevented from entering through the gap between the guide member and the side surface of the armrest. In addition, the second shaft is moved in the second hole which is an elongated hole in a shape along the partial circular arc locus. That is, both end portions of the second hole which is the long hole become regulating points of movement, and thereby capable of defining a range in which the armrest pivots. In other words, by aligning one end portion of the second hole to the stored position and aligning the other end portion thereof to the deployed position, the armrest can be prohibited from pivoting (overturning) beyond the stored position and the deployed position, and therefore, by preventing foreign matter from entering that portion, the operation of the armrest can be effectively prevented from being inhibited due to foreign matter which becomes an obstacle, and the operation of the armrest can be more accurately performed.

In an embodiment, if at least a part of the guide member and at least a part of the plate member are brought into face contact, a function of covering the second hole portion through which the second shaft passes is enhanced, and foreign matter entering can be more effectively prevented. Further, if the first shaft and the second shaft pass through the plate member and are fixed, it is preferable because the plate member can be disposed on the armrest side with a simple configuration.

Moreover, it is preferable if a third hole and a fourth hole are formed in the plate member, one of the first shaft and the second shaft is press-fitted and fixed to the third hole, and the other of the first shaft and the second shaft passes through the fourth hole perforated to have a larger diameter than a shaft outer diameter of the other of the first shaft and the second shaft. By such a configuration, a gap corresponding to a dimensional difference is formed between the hole having a larger diameter and the shaft passing through the hole. Hence, it is preferable because an assembly error of the plate member can be avoided by the gap.

Further, it is preferable if the one of the first shaft and the second shaft is press-fitted into the third hole bored into a substantially square shape which is configured by a side length smaller than a shaft outer diameter of the one. By such a configuration, press fitting is easy because the shaft (the first shaft or the second shaft) of circular cross section is press-fitted into the substantially square-shaped third hole. Moreover, in a cross section of a press-fit portion, the circular shaft (the first shaft or the second shaft) is in a state of internally contacting the substantially square-shaped hole, and therefore a void is formed between the substantially square-shaped hole and the circular shaft (the first shaft or the second shaft) (in the vicinity of apexes of the substantially square shape). By this void, a load to the plate member due to the press-fitted shaft (the first shaft or the second shaft) is mitigated. Moreover, if a slit extending in an outside direction is formed continuously to the third hole, it is preferable because a load to the plate member due to the press-fitted shaft (the first shaft or the second shaft) is mitigated.

Further, it is preferable if, in the guide member, a thickness of a peripheral portion of the first hole is formed thicker than a thickness of a peripheral portion of the second hole. By such a configuration, since the thickness in the vicinity of the first hole which is a first shaft arrangement portion serving a pivot center is increased, rigidity in the vicinity of the pivot center is enhanced. Moreover, it is preferable if, in the guide member, the peripheral portion of the first hole is brought into face contact with the plate member, and the peripheral portion of the second hole and at least a part of the plate member are opposed via a gap. By such a configuration, in the vicinity of the second shaft moving in the second hole which is the long hole, a gap is formed between the second shaft and the plate member, and therefore a load to the second shaft is mitigated. Therefore, a load to the plate member in which the second shaft is inserted is mitigated, and durability of the plate member is improved.

Moreover, it is preferable if, between the plate member and an armrest frame which is a framework of the armrest, a spacer member is interposed. By such a configuration, the gap between the plate member and the armrest frame can be filled. Hence, the plate member can be more efficiently pushed to the guide member, and as a result, the plate member can be effectively brought into face contact with the guide member.

Moreover, it is preferable if the armrest is configured by having two side frames on the armrest side which are disposed separately in the width direction of the seat, and an upper frame on the armrest side which bridges upper ends of the two side frames on the armrest side; and at least a part of the side frame on the armrest side located at the side where the plate member is provided is arranged to be offset to the arrangement direction of the side frame on the armrest side located at the side where the plate member is not provided. By such a configuration, since, corresponding to an amount of offset, a gap is formed between the side frames on the armrest side and the guide member, assembling of members such as the plate member and a spacer is facilitated. It should be noted that "at least a part" is preferably envisaged to be a portion opposed to the guide member.

Further, it is preferable if the armrest is configured by having the armrest frame, a pad provided peripherally in the armrest frame, and a skin material which covers the pad; in the skin material, a work hole which opens to expose a periphery of the first shaft is formed; and the plate member has an outer extension portion which extends in an outside direction than the work hole. By such a configuration, working is facilitated by the work hole, and the plate member can be effectively prevented from falling out to the outside from the work hole because of the outer extension portion serving an obstacle.

Moreover, in the present disclosure, the armrest is preferably used if provided on the inside of the seat back frame. Further, in a concrete application of the present disclosure, the seat is used for a seat whose width direction is larger of a semi-bench seat, and the plate member is preferably used if provided on the inside in the width direction of the seat.

According to an embodiment of the present disclosure, the plate member is interposed between the guide member and the side surface of the armrest, the second hole portion which is the long hole through which the second shaft (which is a moving shaft, and is a stopper shaft) passes is covered, and therefore foreign matter can be effectively prevented from entering the second hole through the gap. In the present disclosure, the above covering function is more enhanced, and foreign matter entering can be more effectively prevented. According to an embodiment of the present disclosure, the plate member can be disposed on the armrest side with a simple configuration, and workability is improved. According to an embodiment of the present disclosure, an assembly error of the plate member can be prevented. According to an embodiment of the present disclosure, a load to the plate member can be mitigated. According to an embodiment of the present disclosure, rigidity in the vicinity of the pivot center is enhanced. According to an embodiment of the present disclosure, durability of the plate member is improved. According to an embodiment of the present disclosure, the plate member can be more efficiently brought into face contact with the guide member. According to an embodiment of the present disclosure, assembling of each member into the gap formed by offset is facilitated. According to an embodiment of the present disclosure, workability is improved, and the plate member can be effectively prevented from falling out to the exterior from the work hole. By applying the present disclosure, it is possible to provide a concretely satisfactory use mode.

BRIEF DESCRIPTION OF DRAWINGS

Various embodiments of the present disclosure are illustrated in the drawings, in which.

DETAILED DESCRIPTION

Hereinafter, one embodiment of the present disclosure is described with reference to the drawings. It should be noted that members, arrangements, and the like described below do not limit the present disclosure, and, of course, can be variously modified in accordance with the purport of the present disclosure. Moreover, in the present specification, a vehicle is intended to refer to a moving vehicle on which a seat can be mounted, including a ground traveling vehicle having wheels such as an automobile and a train, an aircraft and a ship moving on a place other than the ground, and the like. Moreover, a right and left direction means a right and left direction in a state directed to a front of a vehicle, and is a direction corresponding to a width direction of a seat back frame 1 and a seat cushion frame 2 described below. Moreover, a front to back direction means a front to back direction in a state that an occupant is seated.

Figure 1:
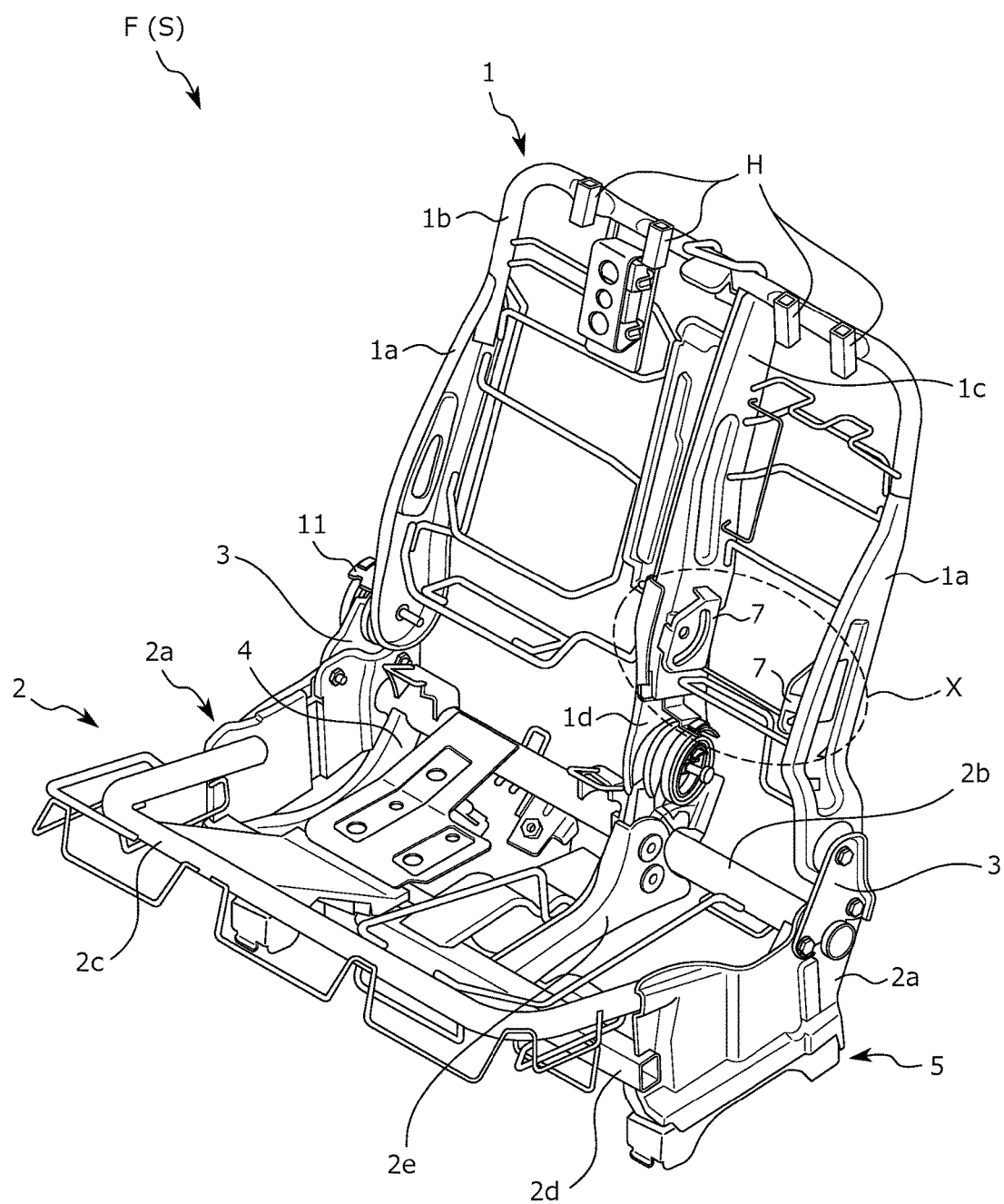
FIG. 1 is a schematic perspective view of a seat frame according to one embodiment of the present disclosure.
Figure 2:
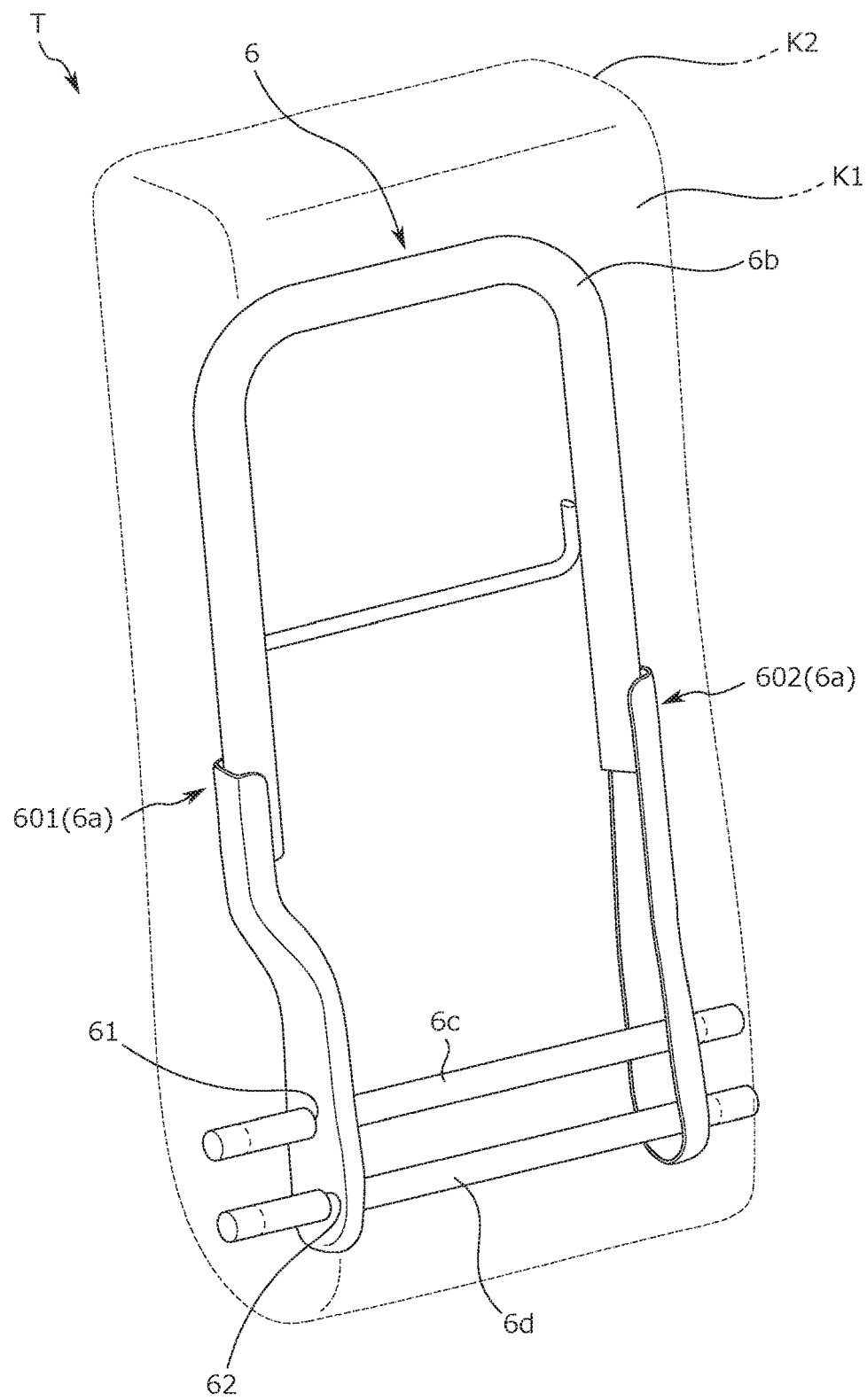
FIG. 2 is a schematic perspective view of an armrest frame according to one embodiment of the present disclosure.
Figure 3A:
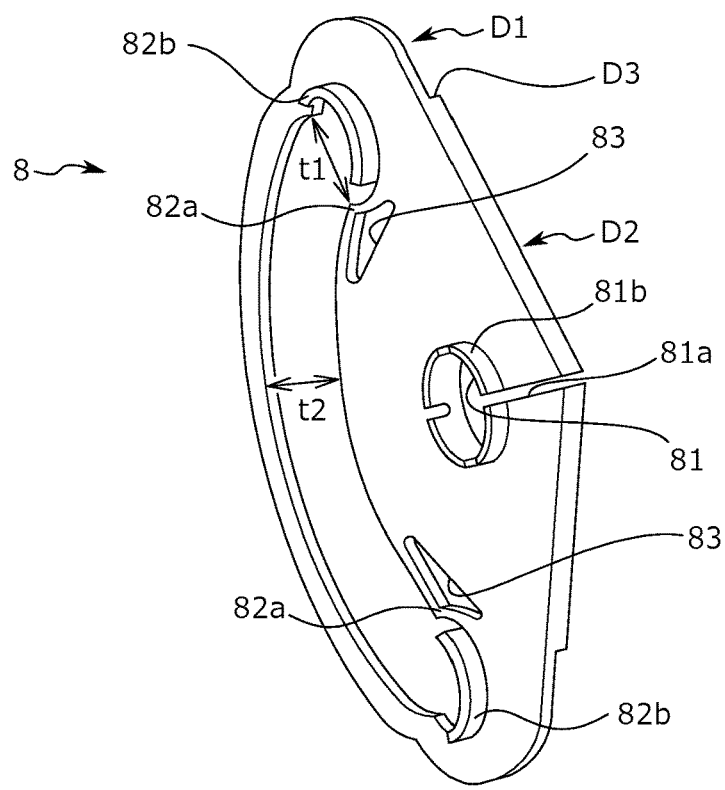
FIG. 3A is a perspective view showing a bushing member according to one embodiment of the present disclosure.
Figure 3B:
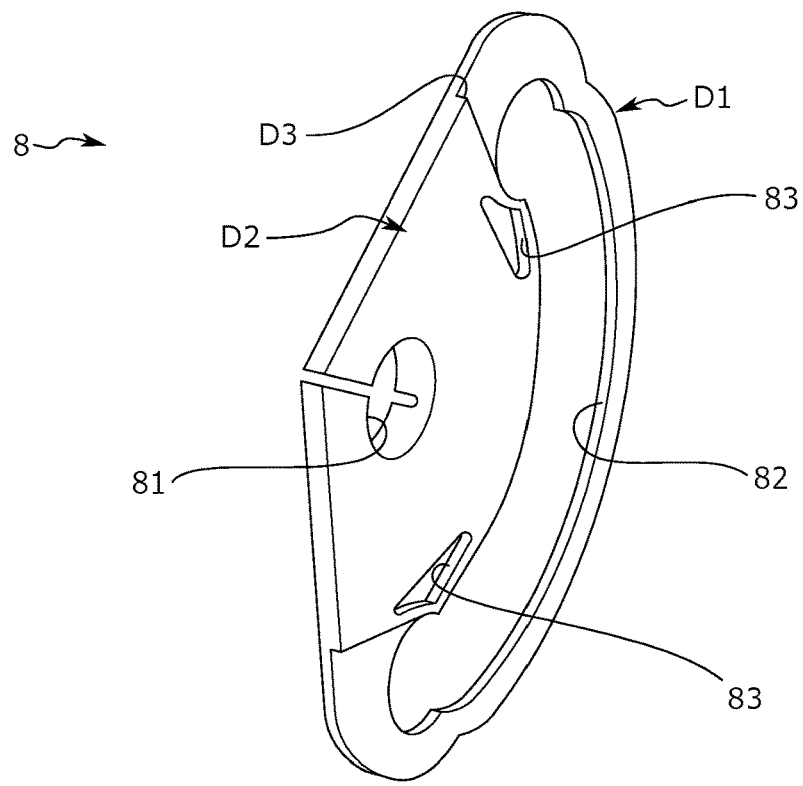
FIG. 3B is a perspective view showing the bushing member according to one embodiment of the present disclosure.
Figure 4:
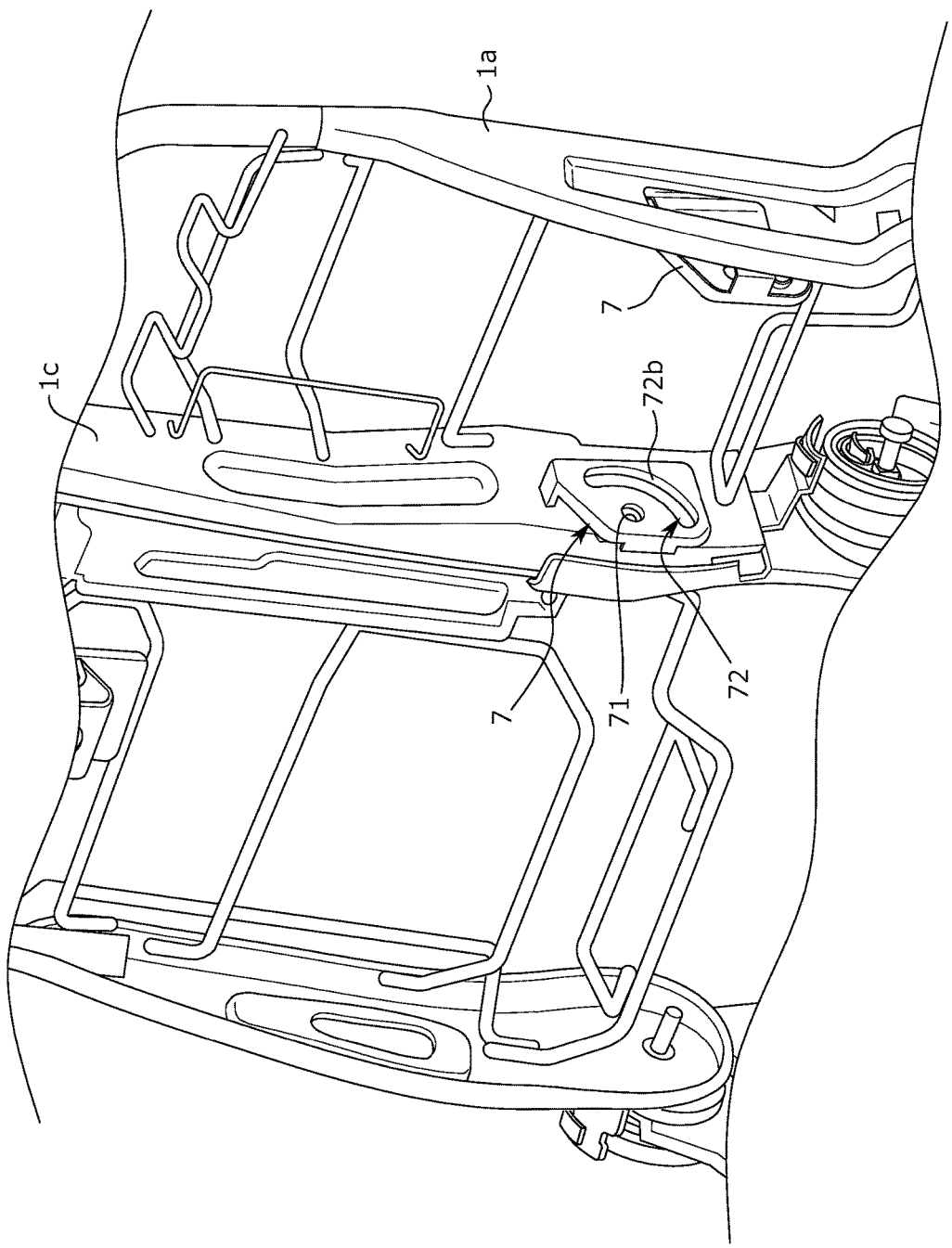
FIG. 4 is a partial, perspective view of an X portion in FIG. 1.
Figure 5:
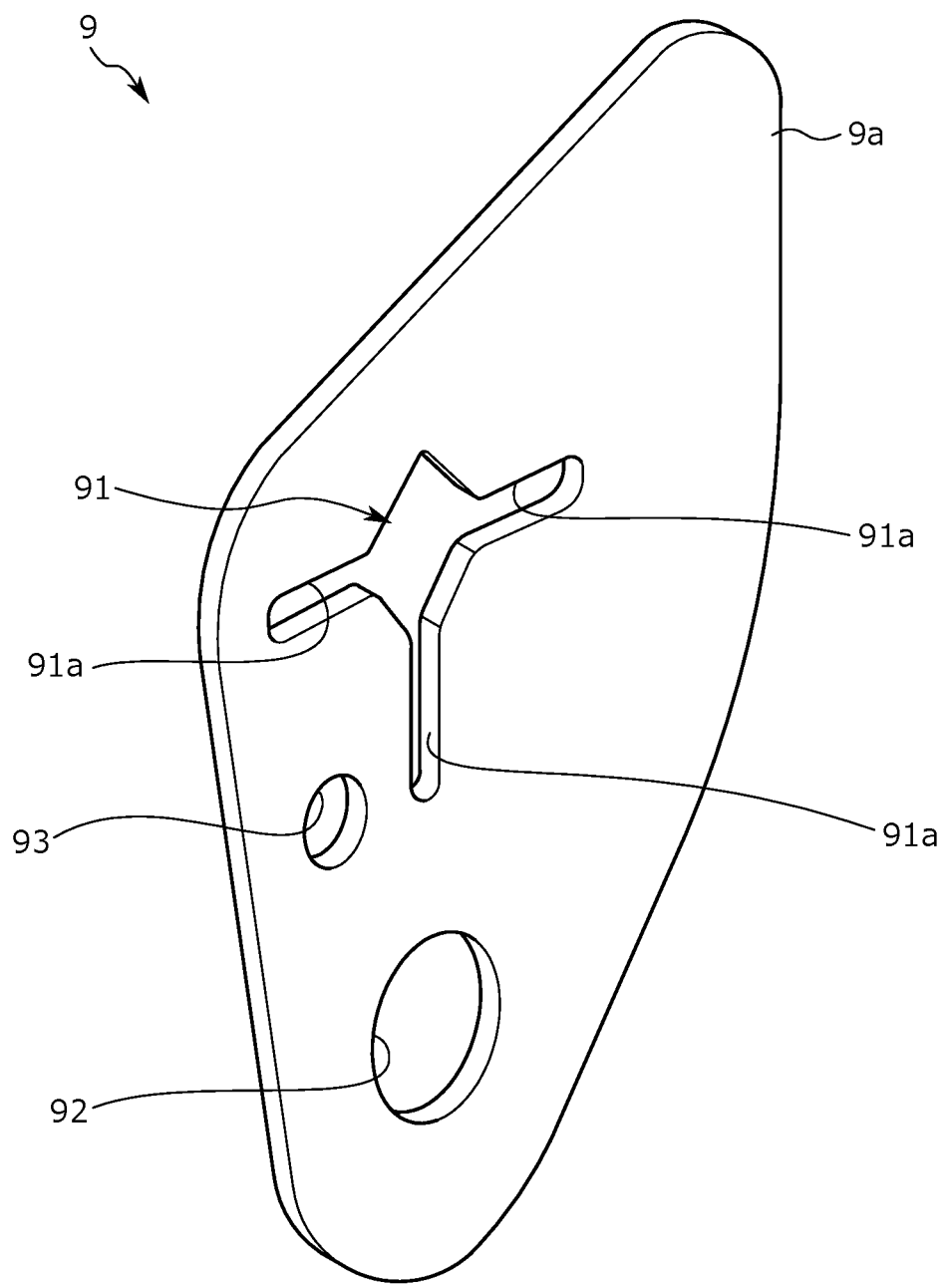
FIG. 5 is a perspective view showing a plate member according to one embodiment of the present disclosure.
Figure 6:
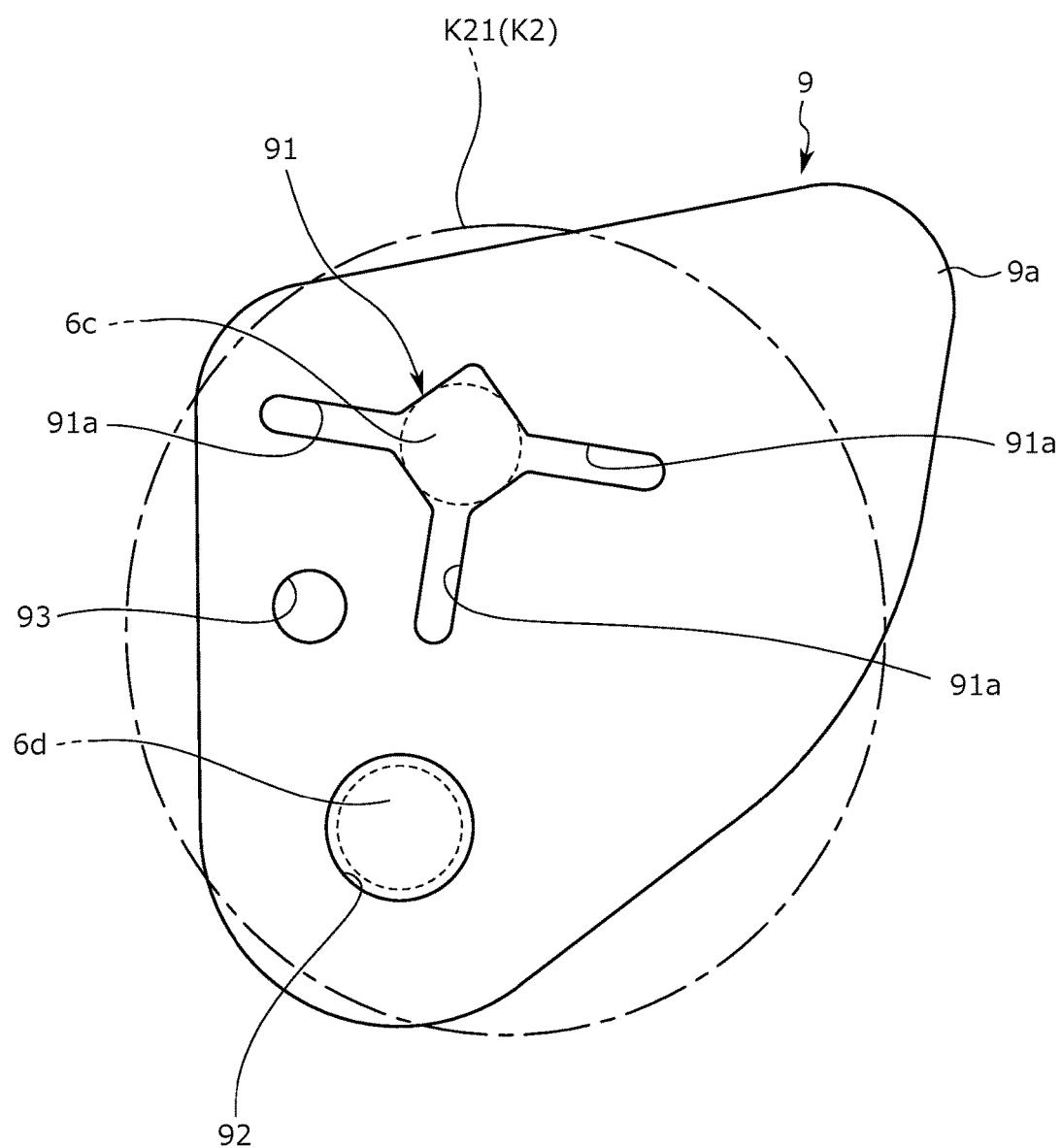
FIG. 6 is a side schematic view showing the plate member according to one embodiment of the present disclosure.
Figure 7:
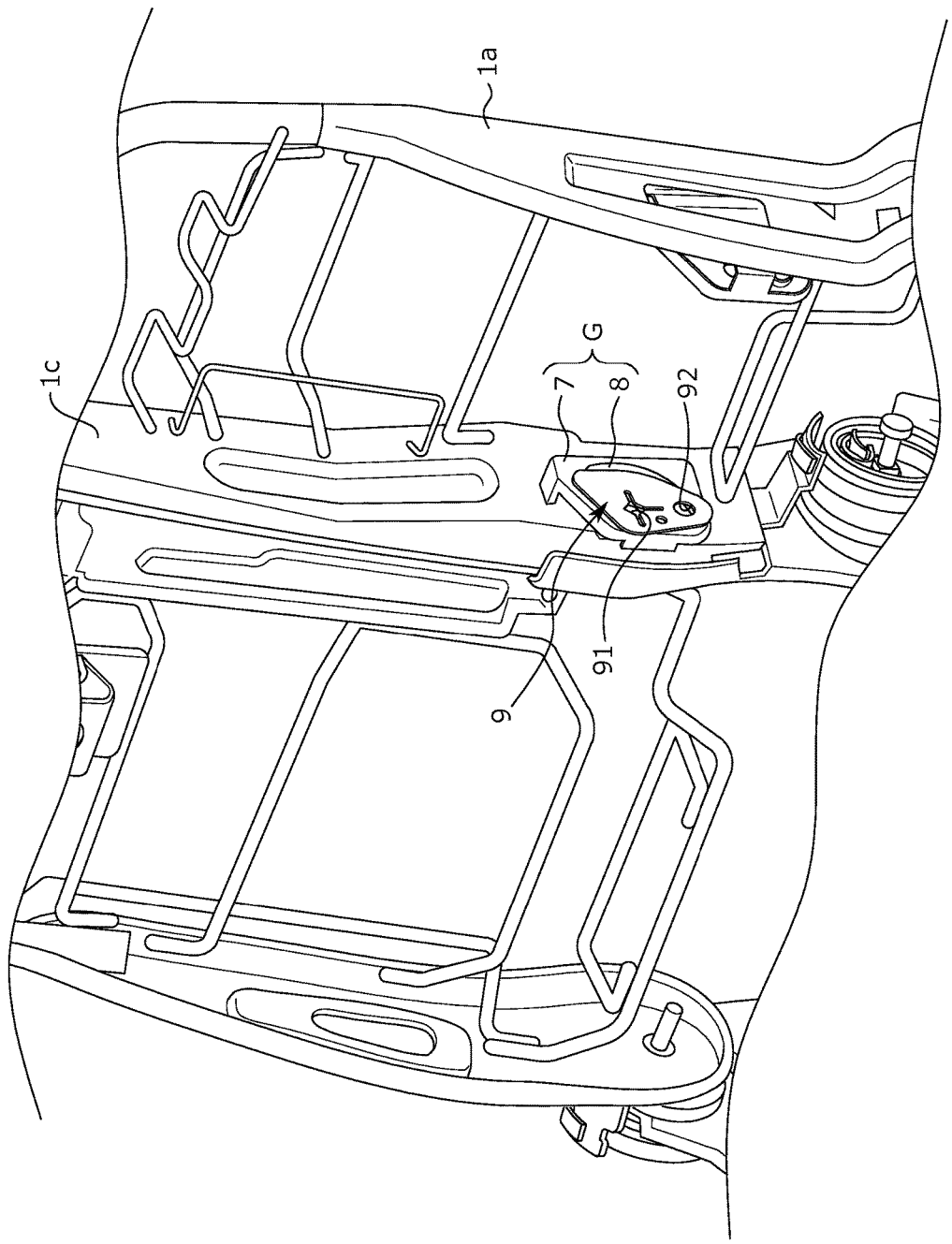
FIG. 7 is a partial, perspective diagram of an assembly process of the plate member according to one embodiment of the present disclosure.
Figure 8:
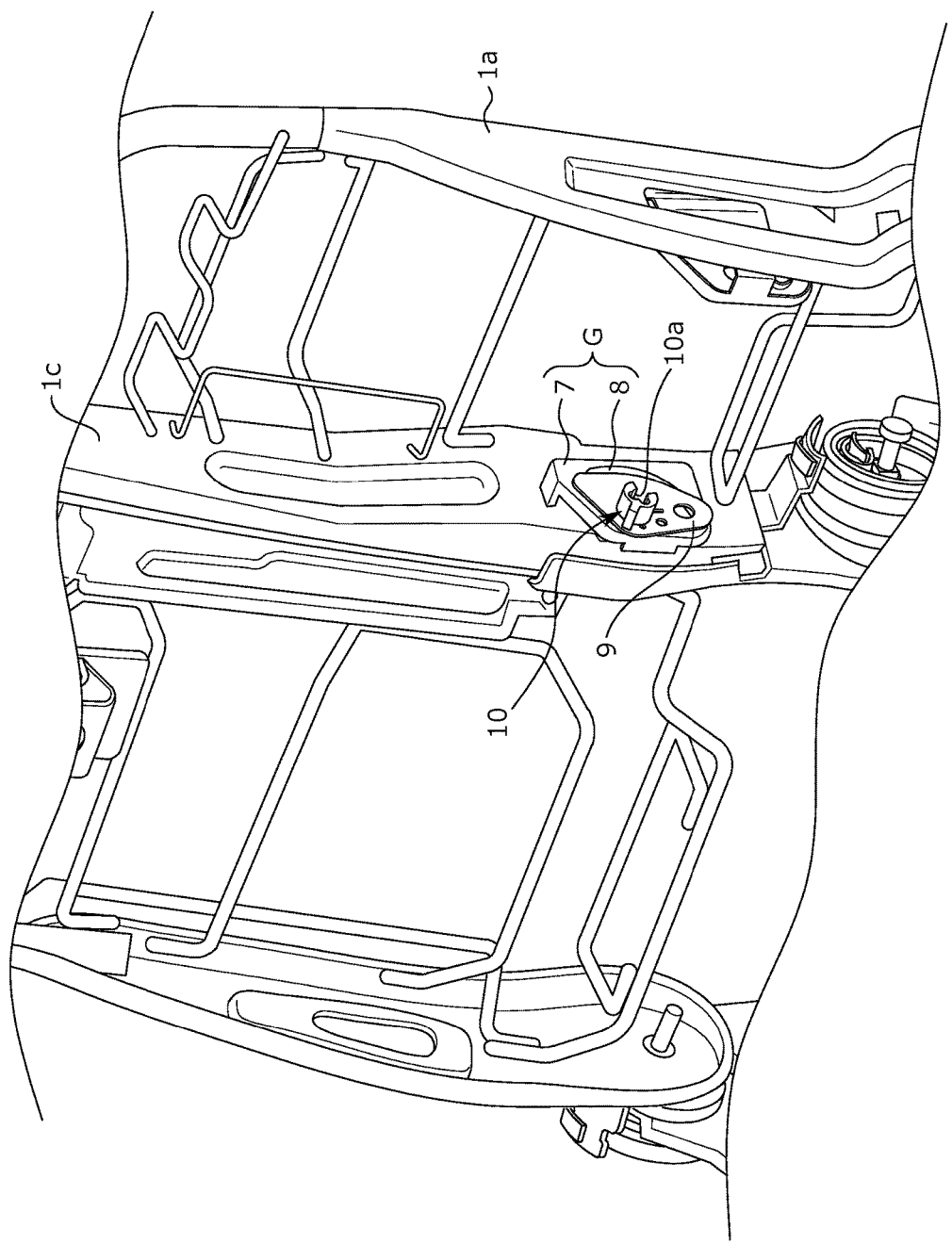
FIG. 8 is a partial, perspective diagram of an assembly process of the plate member according to one embodiment of the present disclosure.
Figure 9:
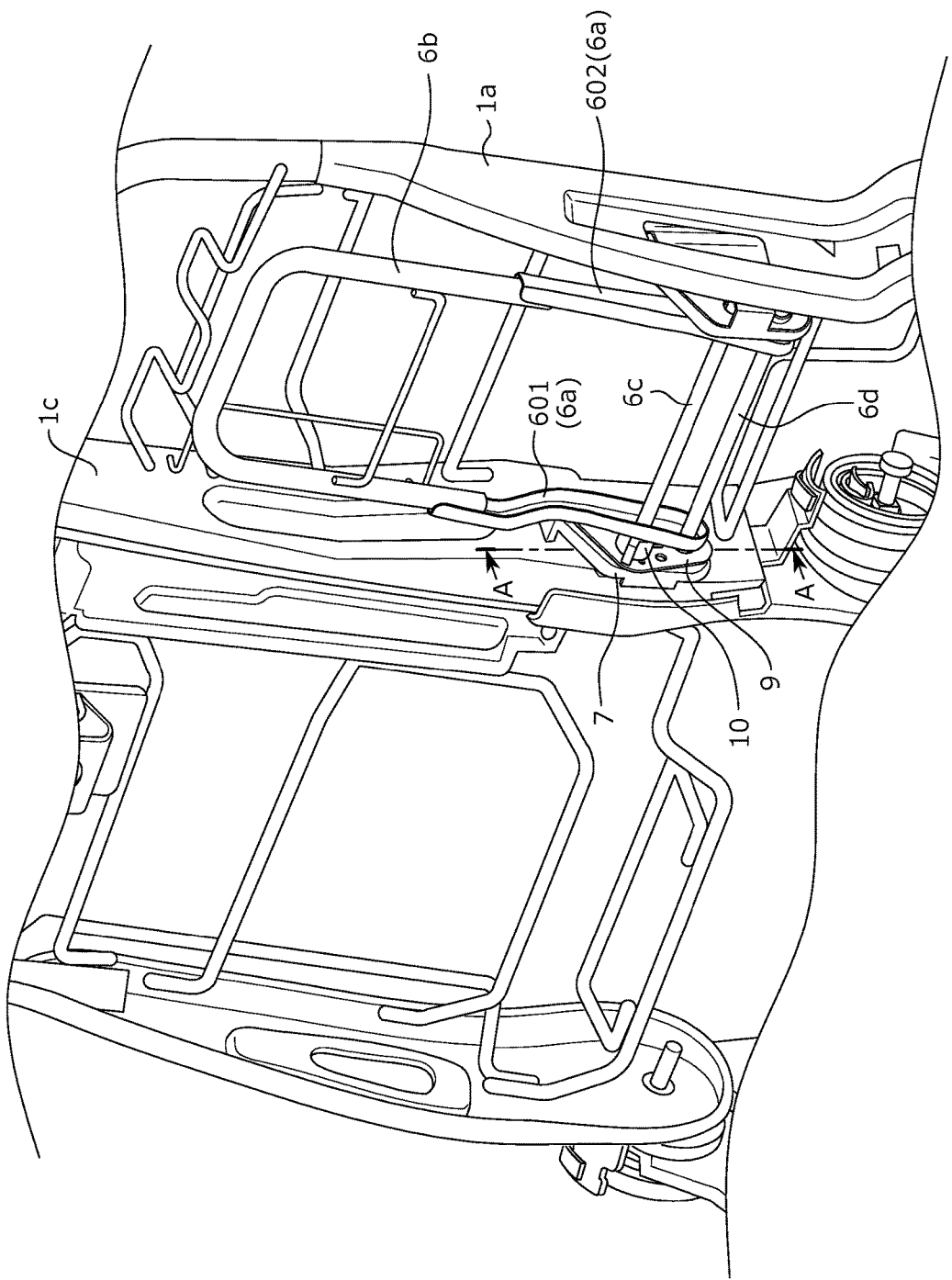
FIG. 9 is a partial, perspective diagram of an assembly process of the plate member according to one embodiment of the present disclosure.
Figure 10:
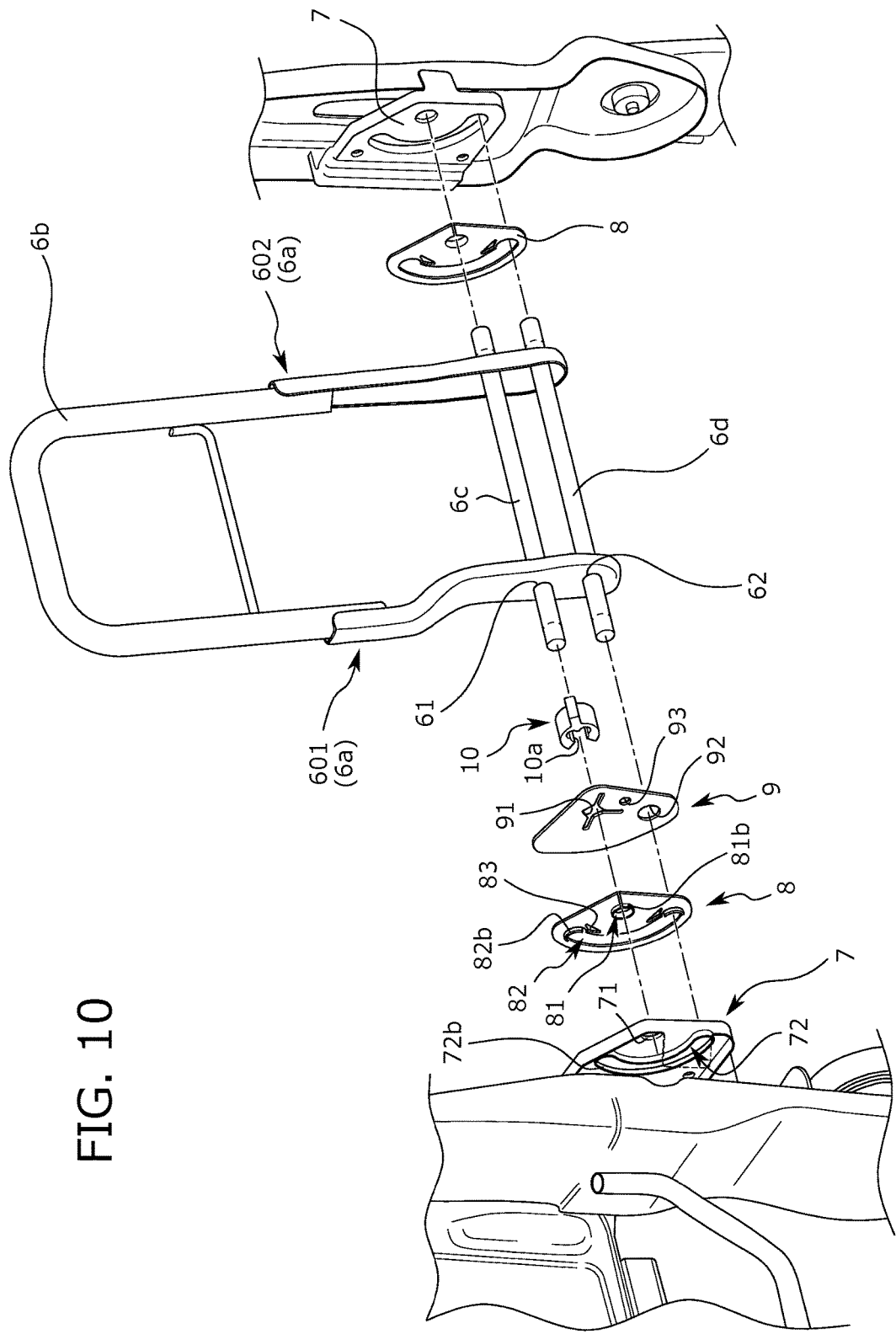
FIG. 10 is an exploded, perspective diagram of incorporation of the plate member according to one embodiment of the present disclosure.
Figure 11:
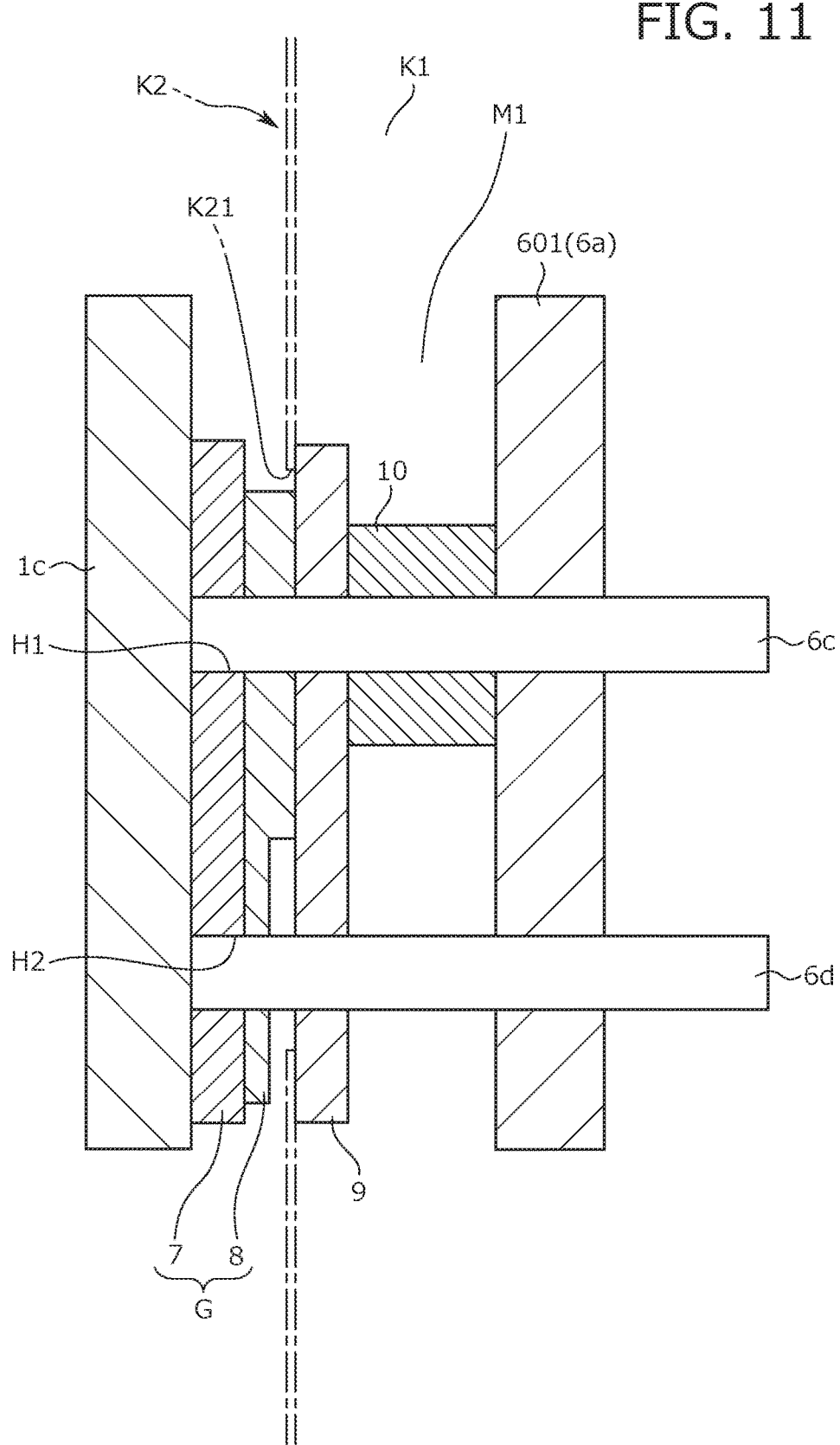
FIG. 11 is a cross-sectional diagram of an A-A cross section in FIG. 9.
Figure 12A:
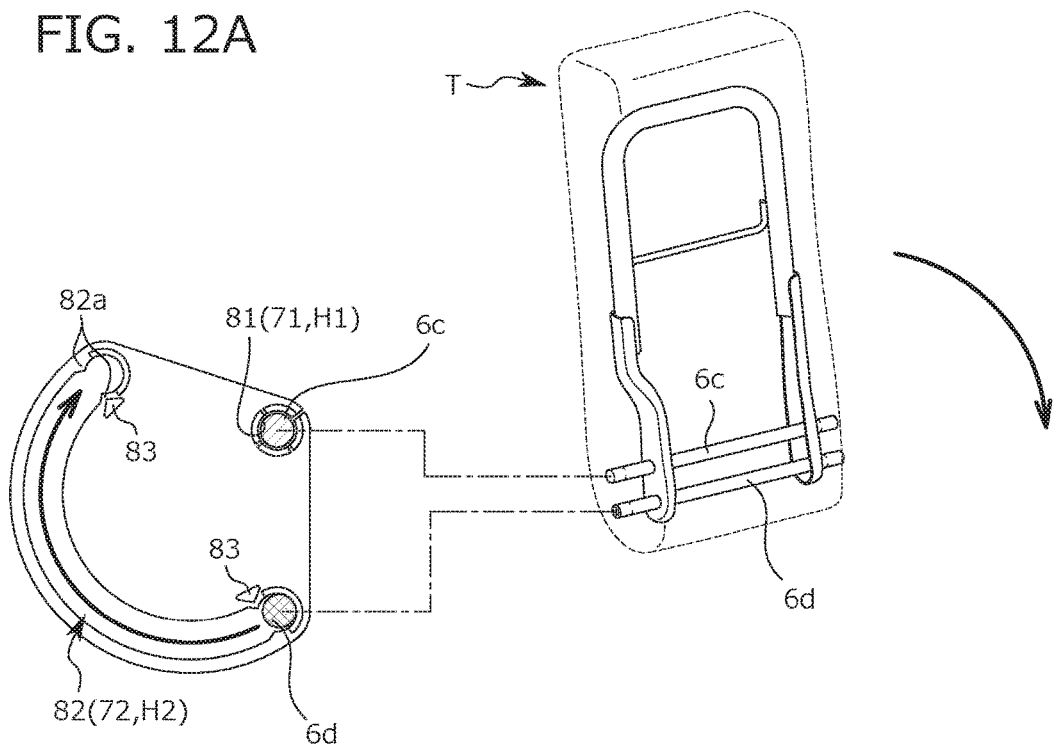
FIG. 12A is a diagram showing a relationship between a position of an armrest and a position of a moving shaft with respect to a cover portion according to one embodiment of the present disclosure.
Figure 12B:
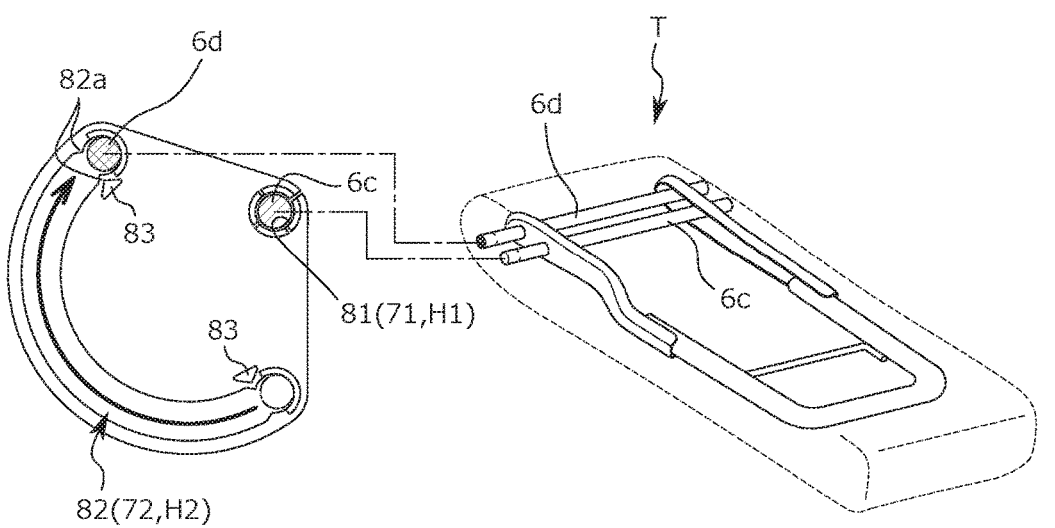
FIG. 12B is a diagram showing a relationship between a position of the armrest and a position of the moving shaft with respect to the cover portion according to one embodiment of the present disclosure.
Figure 13A:
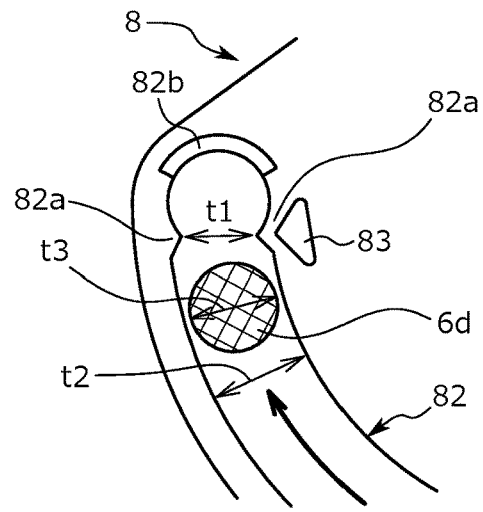
FIG. 13A is a diagram showing a function of narrowed protrusions and a deformed hole according to one embodiment of the present disclosure.
Figure 13B:
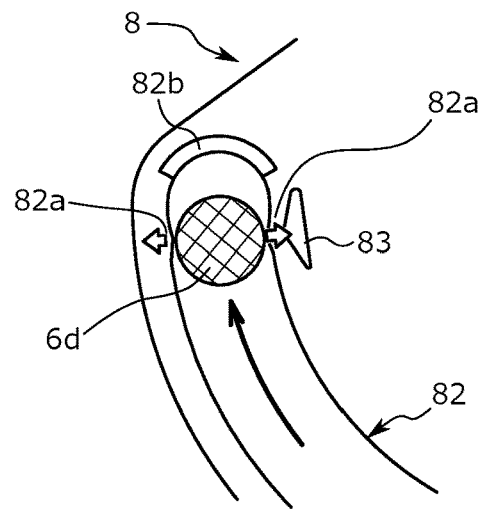
FIG. 13B is a diagram showing a function of the narrowed protrusions and the deformed hole according to one embodiment of the present disclosure.
Figure 13C:
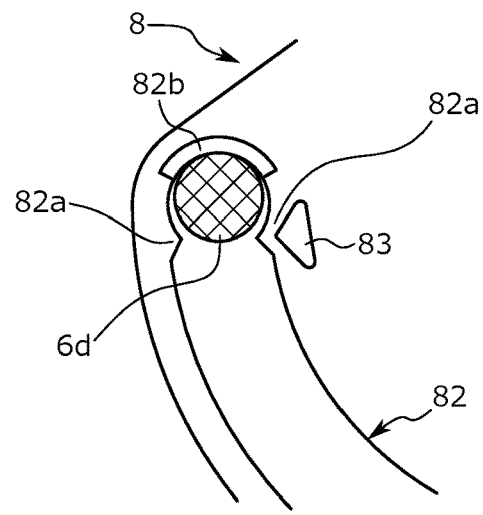
FIG. 13C is a diagram showing a function of the narrowed protrusions and the deformed hole according to one embodiment of the present disclosure.

FIG. 1 to FIG. 13A, FIG. 13B, and FIG. 13C are related to one embodiment of the present disclosure, where FIG. 1 is a schematic perspective view of a seat frame, FIG. 2 is a schematic perspective view of an armrest frame, FIG. 3A and FIG. 3B are perspective views showing a bushing member, FIG. 4 is partial, perspective view of an X portion in FIG. 1, FIG. 5 is a perspective view showing a plate member, FIG. 6 is a side, schematic view showing the plate member, FIG. 7 to FIG. 9 are partial, perspective diagrams of an assembly process of the plate member according to one embodiment of the present disclosure, FIG. 10 is an exploded, perspective diagram of incorporation of the plate member, FIG. 11 is cross-sectional diagram of an A-A cross section in FIG. 9, FIG. 12A and FIG. 12B are diagrams showing a relationship between a position of an armrest and a position of a moving shaft with respect to a cover portion, and FIG. 13A to FIG. 13C are diagrams showing a function of narrowed protrusions and a deformed hole.

Basic Configuration of Vehicular Seat S

Hereinafter, an example in which a seat according to the present disclosure is applied to a vehicular seat is shown. Then, in the present embodiment, an example in which the seat is applied to a seat referred to as a so-called "semi-bench seat" of such a vehicular seat is shown, and more specifically, an example in which a seat whose width direction is larger than the semi-bench seat is applied as a vehicular seat S is described. With reference to FIG. 1 to FIG. 3A, FIG. 3B, the vehicular seat S according to an embodiment is described. As shown in FIG. 1, the vehicular seat S is a seat having a seat frame F as a framework, and when used, is in a state that a cushion pad K1 is disposed on the seat frame F and a surface thereof is covered with a skin material K2. In addition, although illustration is omitted, a finished product of the seat S has a known headrest, and the headrest is formed, for example, by attaching the cushion pad K1 and the skin material K2 to a core material (not shown) of a head portion. Moreover, from the lower side, a headrest pillar (not shown) for being connected to the seat back frame 1 projects. It should be noted that a reference numeral H denotes a pillar support portion which supports t headrest pillar.

The seat frame F of the vehicular seat S, as shown in FIG. 1, comprises the seat back frame 1 and a seat cushion frame 2. The seat back frame 1 is for supporting the back of an occupant, and the cushion pad K1 and the skin material K2 are attached thereto, thereby forming a seat back of the vehicular seat S. Moreover, the seat cushion frame 2 is for supporting the hip of an occupant from below, and similarly, the cushion pad K1 and the skin material K2 are attached thereto, thereby forming a seating portion of the vehicular seat S.

A lower end of the seat back frame 1 and a rear end of the seat cushion frame 2 are connected via coupling members 3, 3, and the seat is configured in such a manner that the angle of the seat back frame 1 with respect to the seat cushion frame 2 is adjustable by a reclining mechanism 11.

Seat Back Frame

As shown in FIG. 1, the seat back frame 1 has a frame-shaped (a frame-shape having an opening downward) member, as a basic configuration, which is formed from side frames 1a, 1a on the seat back side disposed separately in a vehicle width direction, and a substantially U-shaped upper frame 1b disposed to bridge upper ends of the side frames. The upper frame 1b is a substantially U-shaped pipe having an upward protruding portion, whose both free end portions are connected to upper end portions of the side frames 1a, 1a on the seat back side respectively, and to the upper side thereof, the pillar support portion H is welded. Moreover, lower end portions of the side frames 1a, 1a on the seat back side are connected to the rear end side of the seat cushion frame 2 respectively via the reclining mechanism 11 and the coupling members 3, 3. Moreover, between the side frames 1a, 1a on the seat back side, a center frame 1c on the back side is disposed to be parallel thereto. One surface side of a lower end portion of the center frame 1c on the back side is welded to an upper end of a connecting frame 1d. In addition, the connecting frame 1d is mounted to an upper portion on the rear end side of a center frame 2e on a cushion (described below) side via the reclining mechanism 11. In addition, in the present example, the center frame 1c on the back side is formed into a hollow solid shape by combining two frame pieces formed into a similar shape.

Moreover, on the other surface side (the surface opposite to the side where the connecting frame 1d is welded) of the lower end side of the center frame 1c on the back side, an armrest receiving member 7 forming a guide member G is arranged. Moreover, of the two side frames 1a, 1a on the seat back side, also on the side frame 1a on the seat back side located at the side opposed to the other surface side (the surface opposite to the side where the connecting frame 1d is welded) of the lower end side of the center frame 1c on the back side, an armrest receiving member 7 constituting the guide member G is disposed. That is, the armrest receiving members 7, 7 are disposed in opposed positions at the same height. In addition, a detailed configuration and a function of the guide member G provided with the armrest receiving members 7, 7 are main configurations of the present embodiment, and therefore is described below in detail.

Seat Cushion Frame

As shown in FIG. 1, each side frame 2a on the cushion side constituting the seat cushion frame 2 is a member extended in a front to back direction, and is connected to the seat back frame 1 at the rear end portion. Moreover, the side frame 2a on the cushion side located at one end side (the left side) in a right and left direction and the side frame 2a on the cushion side located at the other end side in the right and left direction are separated in the right and left direction in a state of being parallel to each other. The side frames 2a, 2a on the cushion side are connected via a rear side coupling pipe 2b at the rear end side and via a front side upper portion coupling pipe 2c at the front end upper side, respectively. The rear side coupling pipe 2b is a pipe member extending from one end in a width direction of the vehicular seat S to the other end.

Moreover, the front side upper portion coupling pipe 2c is a pipe member formed by bending into a substantially U-shape, and both free ends thereof are connected to front end portions of the side frames 2a, 2a on the cushion side. That is, the substantially U-shaped front side upper portion coupling pipe 2c is connected to the front end portions of the side frames 2a, 2a on the cushion side at both of the free ends thereof in a state where the front side upper portion coupling pipe 2c protrudes forward. Moreover, on the front end lower side of the side frames 2a, 2a on the cushion side, an angular cylindrical front side lower portion coupling bar 2d is bridged.

In this way, the rectangular frame-shaped seat cushion frame 2 is formed as a basic configuration by these side frames 2a, 2a on the cushion side, rear side coupling pipe 2b, front side upper portion coupling pipe 2c, and front side lower portion coupling bar 2d. Moreover, between the two side frames 2a, 2a on the cushion side, the center frame 2e on the cushion side is disposed to be parallel thereto. The center frame 2e on the cushion side is fixed to the front side lower portion coupling bar 2d at the front end side thereof, the rear end side thereof is mounted to the rear side coupling pipe 2b in a state that the rear side coupling pipe 2b passes therethrough, and the upper portion thereof is mounted to the lower end portion of the connecting frame 1d via the reclining mechanism 11.

Moreover, in the lower portion of the side frames 2a, 2a on the cushion side, rail coupling members 5, 5 are arranged. To one side frame 2a on the cushion side, the rail coupling member 5 is directly welded at the lower portion thereof. On the inside of the other side frame 2a on the cushion side, a lower frame 4 is arranged (to bridge the front side lower portion coupling bar 2d and the rear side coupling pipe 2b), and to the lower end side of the lower frame 4, the rail coupling member 5 is welded. In addition, although illustration is omitted, in the lower portion of the seat cushion frame 2, a known rail device is provided. As with a known configuration, the rail device is configured by two sets of combined bodies of an upper rail and a lower rail, and the respective combined bodies of the upper rail and the lower rail are disposed in the lower portion of both of the side frames 2a, 2a on the cushion side respectively. Then, both of the lower rails are fixed to a vehicle body floor, and both of the upper rails are directly or indirectly connected to the side frames 2a, 2a on the cushion side respectively.

Armrest

With reference to FIG. 2, an armrest T according to the present embodiment is now described. It should be noted that FIG. 2 shows the armrest T in a stored state, and in this state, an up and down direction is defined as shown in FIG. 2. The armrest T is a substantially rectangular parallelepiped shaped member configured by having an armrest frame as a framework, and when used, is in a state that the cushion pad K1 is disposed on the armrest frame 6 and a surface thereof is covered with the skin material K2.

The armrest frame 6 has a frame-shaped (a frame-shape having an opening downward) member, as a basic configuration, which is composed of two side frames 6a, 6a on the armrest side disposed separately in a width direction, and a substantially U-shaped upper frame 6b on the armrest side disposed to bridge upper ends of the side frames. The upper frame 6b on the armrest side is a substantially U-shaped pipe having an upward protruding portion, whose both free end portions are connected to upper end portions of the side frames 6a, 6a on the armrest side respectively. In addition, of the side frames 6a, 6a on the armrest side, the side frame 6a located at the center frame 1c on the back side (hereinafter, referred to as "a center side frame 601 on the armrest side") is formed by bending so that a lower end portion thereof approaches to a direction of the other side frame 6a on the armrest side (hereinafter, referred to as "other side frame 602 on the armrest side"). That is, the center side frame 601 on the armrest side is configured to extend downwardly by bending once to the other side frame 602 on the armrest side from a slight lower position than a coupling portion with the lower end of the upper frame 6b on the armrest side (that is, the portion is offset to the other side frame 602 on the armrest side), and therefore, the distance between the center frame 1c on the back side and the lower portion of the center side frame 601 on the armrest side is larger than that of the upper portion. In a space between the center frame 1c on the back side and the lower portion of the center side frame 601 on the armrest side (hereinafter, referred to as "a member arrangement space M1") a plate member 9 and a spacer 10 described below are arranged. The arrangement configuration is described below in detail. Further, in the lower end portions of the side frames 6a, 6a on the armrest side, pivot center shaft through-holes 61, 61 are respectively formed, and stopper shaft through-holes 62, 62 are similarly formed. The stopper shaft through-hole 62 is formed in the lower end portion of the side frame 6a on the armrest side, and the pivot center shaft through-hole 61 is formed in a slightly upper portion on the rear side than the stopper shaft through-hole 62.

Then, between both of the pivot center shaft through-holes 61, 61, a pivot center shaft 6c which is a round bar-shaped member passes, and between both of the stopper shaft through-holes 62, 62, a stopper shaft 6d which is a round bar-shaped member passes. both of the end portions of these pivot center shaft 6c and stopper shaft 6d pass through both of the pivot center shaft through-holes 61, 61 and both of the stopper shaft through-holes 62, 62 and project to the outside. That is, both of the end portions of the pivot center shaft 6c and the stopper shaft 6d project to the outside than the side frames 6a, 6a on the armrest side, and also in a state that a cushion material and the skin material K2 are disposed, pass the skin material K2 and project to the outside. The armrest T is pivotably mounted between the guide members G, G (between the armrest receiving members 7, 7). That is, both of the projection ends of the pivot center shaft 6c and the stopper shaft 6d are rotatably supported by the guide members G, G (the armrest receiving members 7, 7) to be pivotable respectively. This configuration is a main configuration of the present embodiment, and therefore is described below in detail.

Guide Member: Bushing Member

The guide member G is configured by having a bushing member 8 and the armrest receiving member 7 is now described. That is, the guide member G according to the present embodiment is configured by combining the bushing member 8 and the armrest receiving member 7. Firstly, with reference to FIG. 3A and FIG. 3B, the bushing member 8 is described. It should be noted that, since the bushing members 8 are disposed on the two armrest receiving members 7 respectively, in the present example, two bushing members are used. The bushing member 8 is a substantially sector-shaped flat plate member. In the vicinity of the center of the substantially sector, pivot center shaft through-hole 81 on the bushing member side is formed. Then, from the pivot center shaft through-hole 81 on the bushing member side, a slit 81a is formed toward an apical direction of the bushing member 8. Moreover, from a periphery of the pivot center shaft through-hole 81 on the bushing member side, a locking pawl 81b on the center shaft through-hole side rises.

Moreover, along an arc shape around the pivot center shaft through-hole 81 on the bushing member side, a stopper shaft moving hole 82 on the bushing member side is formed as a long hole. On both end sides of the stopper shaft moving hole 82 on the bushing member side, narrowed protrusions 82a, 82a are respectively formed, and in the portions of the narrowed protrusions 82a, 82a, the stopper shaft moving hole 82 on the bushing member side is configured to be smaller in width thereof. The narrowed protrusion 82a is a substantially triangular protruding portion formed to protrude toward the inside of the stopper shaft moving hole 82 on the bushing member side, and two protrusions are formed on one end side. That is, one narrowed protrusion 82a is configured to protrude toward the inside of the stopper shaft moving hole 82 on the bushing member side from the pivot center shaft through-hole 81 on the bushing member side, the other narrowed protrusion 82a is configured to protrude toward the inside of the stopper shaft moving hole 82 on the bushing member side located at the opposite side, and the apex portions of the two narrowed protrusions 82a, 82a are opposed within the stopper shaft moving hole 82 on the bushing member side.

By such a configuration, a distance t1 between the apexes of the two narrowed protrusions 82a, 82a becomes smaller than a width t2 of the other portion of the stopper shaft moving hole 82 on the bushing member side. Then, the width t2 of the other portion of the stopper shaft moving hole 82 on the bushing member side is configured to be slightly larger than an outer diameter t3 of the stopper shaft 6d, and the distance t1 between the two narrowed protrusions 82a, 82a is configured to be smaller than the outer diameter t3 of the stopper shaft 6d. Then, a space between the positions of the apexes of the two narrowed protrusions 82a, 82a and the proximate end portion is configured to be almost a same as a cross section of the stopper shaft 6d, and that is, in the space, the stopper shaft 6d is configured to be locked. This configuration is provided on both ends of the stopper shaft moving hole 82 on the bushing member side respectively. That is, in the present example, two sets of two narrowed protrusions 82a, 82a are provided (one set is provided on both of the end sides, respectively).

Moreover, from the peripheries of both of the end portions of the stopper shaft moving hole 82 on the bushing member side, locking pawls 82b, 82b on the stopper shaft through-hole side rise respectively. The rising direction of the locking pawls 82b, 82b on the stopper shaft through-hole side is a direction same as the rising direction of the above-mentioned locking pawl 81b on the center shaft through-hole side, and is a direction in which the armrest receiving member 7 to be mounted is arranged.

Moreover, of the narrowed protrusion 82a formed on the pivot center shaft through-hole 81 side on the bushing member side, in the pivot center shaft through-hole 81 side on the bushing member side, a substantially triangular deformed hole 83 is formed. The deformed hole 83 is bored so that the vicinity of an apex thereof is along the shape of the narrowed protrusion 82a. That is, the deformed hole 83 is perforated so that the apex is directed to the stopper shaft moving hole 82 on the bushing member side. In addition, in the present example, the deformed hole 83 is also formed in both of the end portions (two holes in total) respectively.

Moreover, the bushing member 8 is not a completely flat member, and is configured so that a thickness of a portion where the stopper shaft moving hole 82 on the bushing member side is perforated (which is the vicinity of the end portion on the substantially circular arc shape side, and hereinafter, is referred to as "a plate member non-abutment portion D1") is thinner than that of a portion where the pivot center shaft through-hole 81 on the bushing member side and the deformed holes 83, 83 are perforated (which is a sector portion around the pivot center shaft through-hole 81 on the bushing member side and not including the stopper shaft moving hole 82 on the bushing member side, and hereinafter, is referred to as "a plate member abutment portion D2"). That is, a stepped portion D3 is formed in a boundary portion between both of the portions, and the thicknesses of both of the portions are configured to be different. Thereby, the plate member abutment portion D2 to which the plate member 9 described below abuts is increased in thickness and improved in rigidity, and the plate member non-abutment portion D1 is decreased in thickness from the stepped portion D3 as a boundary, therefore, the plate member 9 in face contact with the plate member abutment portion D2 can be effectively prevented from abutting the plate member non-abutment portion D1 which is a portion where the stopper shaft moving hole 82 on the bushing member side is formed.

Guide Member: Armrest Receiving Member

With reference to FIG. 4, the armrest receiving member 7 is now described. As mentioned above, although the two armrest receiving members 7 exist, only one of them is described because they have a similar configuration. The armrest receiving member 7 is formed with a pivot center shaft through-hole 71 on the receiving member side at the front side thereof, and along an arc shape around the pivot center shaft through-hole 71 on the receiving member side, a stopper shaft moving hole 72 on the receiving member side is formed as a long hole. Then, from a periphery of the stopper shaft moving hole 72 on the receiving member side, a receiving wall 72b on the stopper shaft through-hole side rises (see FIG. 10).

The pivot center shaft through-hole 71 on the receiving member side and stopper shaft moving hole 72 on the receiving member side are formed in the size and positional relationship similar to that of the pivot center shaft through-hole 81 on the bushing member side and stopper shaft moving hole 82 on the bushing member side formed in the above-mentioned bushing member 8. Therefore, the bushing member 8 can be overlapped with the armrest receiving member 7 in such a manner that the pivot center shaft through-hole 71 on the receiving member and the pivot center shaft through-hole 81 on the bushing member side are communicated, and the stopper shaft moving hole 72 on the receiving member side and the stopper shaft moving hole 82 on the bushing member side are communicated.

Then, when overlapping the bushing member 8 with the armrest receiving member 7, the locking pawl 81b on the center shaft through-hole side is press-fitted and locked to the pivot center shaft through-hole 71 on the receiving member, and the locking pawls 82b, 82b on the stopper shaft through-hole side are press-fitted to both end portions of the stopper shaft moving hole 72 on the receiving member side and locked to an inner wall portion of the receiving wall 72b on the stopper shaft through-hole side at both of the end portions, thereby the bushing member 8 can be mounted to the armrest receiving member 7. At the time of mounting of the bushing member, the slit 81a and the deformed hole 83 are bent, and thereby capable of efficiently performing the mounting.

Plate Member

With reference to FIG. 5 and FIG. 6, the plate member 9 according to the present embodiment is described. The plate member 9 is a member which is interposed between the guide member G and the center side frame 601 on the armrest side and is for preventing foreign matter entering. The plate member 9 according to the present embodiment is a substantially sector-shaped flat plate member. In the vicinity of the substantially sector, a pivot center shaft through-hole 91 on the plate member side which is perforated into a substantially square shape and is corresponding to a third hole is formed. The length of an opening side of the pivot center shaft through-hole 91 on the plate member side is configured to be slightly smaller than an outer diameter of the pivot center shaft 6c, and therefore, the pivot center shaft 6c is press-fitted and fixed to the pivot center shaft through-hole 91 on the plate member side. Thus, the reason why the pivot center shaft through-hole 91 on the plate member side is formed into a substantially square shape is described. As shown in FIG. 6, when the pivot center shaft 6c is press-fitted into the pivot center shaft through-hole 91 on the plate member side in the substantially square shape having a side slightly smaller than the outer diameter of the pivot center shaft 6c, the pivot center shaft 6c press-fits each side of the pivot center shaft through hole 91 on the plate member side, but a gap is formed in the apex portions of the square shape because a circular shape internally contacts the square shape. Hence, it is possible to mitigate a load to the plate member 9 due to the pivot center shaft 6c because this gap is formed.

Then, from three apex portions of the pivot center shaft through-hole 91 on the plate member side, three slits 91a on the plate member side are formed to extend radially respectively. The slits 91a on the plate member side are formed in this way, and thereby a load to the plate member 9 can be further mitigated.

Moreover, in the plate member 9, in the vicinity of a partial substantially circular arc-shaped end portion and in a position corresponding to a front side of the vehicular seat S, a stopper shaft through-hole 92 on the plate member side corresponding to a fourth hole is formed. An inner diameter of the stopper shaft through-hole 92 on the plate member side is configured to be slightly larger than the outer diameter of the stopper shaft 6d. By such a configuration, it is possible to avoid an error during assembly. Moreover, between the pivot center shaft through-hole 91 on the plate member side and the stopper shaft through-hole 92 on the plate member side, an incorrect assembly prevention hole 93 is formed. In addition, the incorrect assembly prevention hole 93 is formed to be located on the front side of the vehicular seat S at the time of assembly of the plate member 9.

Moreover, in the skin material K2, a work hole K21 on the skin material side which is an opening for working and is corresponding to a work hole is formed (see FIG. 6). Then, in the plate member 9, the vicinity of the partial substantially circular arc shaped rear end portion of the vehicular seat S is configured not to be exposed to the outside from the work hole K21 on the skin material side, and a portion which is not exposed is referred to as "an outer extension portion 9a". As thus described, since the outer extension portion 9a is configured not to be exposed from the work hole K21 on the skin material side, the plate member 9 can be effectively prevented from falling out to the outside from the work hole K21 on the skin material side.

Armrest Mounted State

With reference to FIG. 4, and FIG. 7 to FIG. 11, a mounted state of the armrest T is described. Firstly, as mentioned above, the guide members G, G are configured by mounting the bushing members 8, 8 to the armrest receiving members 7, 7. It should be noted that since the guide members G, G have a similar configuration, only one of them is described. Firstly, as shown in FIG. 4, the armrest receiving member 7 is mounted by welding to the center frame 1c on the back side (the other is mounted to the side frame 1a on the seat back side). Then, as shown in FIG. 11, the bushing member 8 is assembled to the armrest receiving member 7. At this time, the pivot center shaft through-hole 71 on the receiving member side and the pivot center shaft through-hole 81 on the bushing member side are disposed to communicate (hereinafter, this communication hole is referred to as "a first communication hole H1"), and the stopper shaft moving hole 72 on the receiving member side and the stopper shaft moving hole 82 on the bushing member side are disposed to communicate (hereinafter, this communication hole is referred to as "a second communication hole H2"). It should be noted that the first communication hole H1 corresponds to a first hole and the second communication hole H2 corresponds to a second hole. The bushing member 8 is thus mounted to the armrest receiving member 7, and the end portion of the pivot center shaft 6c is pivotably inserted into the first communication hole H1. Moreover, at the same time, the end portion of the stopper shaft 6d is inserted into the second communication hole H2 movably along the long hole.

A position of the plate member 9 is now described. Of the side frames 6a, 6a on the armrest side, the plate member 9 is provided only on the center side frame 601 side on the armrest side which is the side arranged on the center frame 1c on the back side. On the other side frame 602, the plate member 9 and the spacer 10 described below are not disposed, and the other side frame 602 on the armrest side and the bushing member 8 are configured to be opposed directly.

As shown in FIG. 7, FIG. 10, and FIG. 11, the plate member 9 is disposed to be stacked on the bushing member 8. At this time, the pivot center shaft 6c is press-fitted into the pivot center shaft through-hole 91 on the plate member side, and the stopper shaft 6d is inserted into the stopper shaft through-hole 92 on the plate member side. In addition, in an initial state shown in FIG. 7 (in a state that the armrest T is in a position in the stored state), the outer extension portion 9a is stacked to be disposed rearward, and by such a stacking, the incorrect assembly prevention hole 93 is located forwardly.

Moreover, in the present embodiment, the spacer 10 in a circlip-like shape is disposed. The spacer 10 is a circlip configured into a substantially cylindrical shape and formed with a spacer slit 10a crossing between both openings in the side surface thereof. Then, by pushing the pivot center shaft 6c into an inner hole from the spacer slit 10a, the spacer 10 is mounted to the pivot center shaft 6c. That is, in such a configuration, the pivot center shaft 6c can be held by a restoring force of the spacer slit 10a.

Then, as shown in FIG. 8 to FIG. 11, the spacer 10 is mounted to the pivot center shaft 6c to be interposed between the plate member 9 and the center side frame 601 on the armrest side. In addition, as mentioned above, since the lower portion of the center side frame 601 on the armrest side is offset to the other side frame 602 on the armrest side, the member arrangement space M1 is formed between the center frame 1c on the back side and the lower portion of the center side frame 601 on the armrest side, and therefore, the plate member 9 and the spacer 10 can be put in the member arrangement space M1.

Motion of Armrest and Associated Configuration

The motion of the armrest T is described with reference to FIG. 12A and FIG. 12B. It should be noted that, hereinafter, the description is according to the relevance between the guide member G and the armrest T, and the plate member 9 and the spacer 10 are only led to rotate in association with the pivot and the displacement of the pivot center shaft 6c and the stopper shaft 6d, and therefore, illustration of the plate member 9 and the spacer 10 is omitted. The bushing member 8 is mounted to the armrest receiving member 7 as described above, and is immovable. FIG. 12A shows a stored state that the armrest T rises substantially perpendicular to the vehicle body floor, and at this time, the stopper shaft 6d is disposed on one end (a lower end) side of the communication hole between the stopper shaft moving hole 72 on the receiving member side and the stopper shaft moving hole 82 on the bushing member side. In this state, when the armrest T is pivoted (laid) to the arrow direction, the position of the pivot center shaft 6c is immovable, but the stopper shaft 6d is moved in the arrow direction within the communication hole between the stopper shaft moving hole 72 on the receiving member side and the stopper shaft moving hole 82 on the bushing member side.

Displacement of Armrest Between Stored Position and Usage Position

Then, in a state that the armrest T is deployed to a usage position shown in FIG. 12B, the stopper shaft 6d is disposed on the other end (an upper end) side of the communication hole between the stopper shaft moving hole 72 on the receiving member side and the stopper shaft moving hole 82 on the bushing member side. In addition, since, in both end positions of the communication hole between the stopper shaft moving hole 72 on the receiving member side and the stopper shaft moving hole 82 on the bushing member side, the stopper shaft 6d cannot move further, both of the end positions become the stored position and a usage position, and further pivot of the armrest T is prohibited.

With reference to FIG. 13A to FIG. 13C, a stopper function and a recognition mechanism of a displacement completion point is now described. As described above, the armrest T in the present example is displaced between the stored position and the usage position, and when reaching the stored position and the usage position which are terminal points, the stopper shaft 6d is in a state of being disposed in both of the respective end positions of the communication hole between the stopper shaft moving hole 72 on the receiving member side and the stopper shaft moving hole 82 on the bushing member side. In this way, when the stopper shaft 6d reaches both of the end positions of the communication hole between the stopper shaft moving hole 72 on the receiving member side and the stopper shaft moving hole 82 on the bushing member side, in the present example, a mechanism for recognizing that those positions are pivot completion points exists.

As described above, the distance t1 between the apexes of the two narrowed protrusions 82a, 82a is configured to be smaller than the width t2 of the other portion of the stopper shaft moving hole 82 on the bushing member side, and similarly, the distance t1 between the apexes of the two narrowed protrusions 82a, 82a is configured to be smaller than the outer diameter t3 of the stopper shaft 6d. Therefore, when the stopper shaft 6d moves and reaches the position between the apexes of the two narrowed protrusions 82a, 82a, as shown in FIG. 13B, the stopper shaft 6d passes the position while spreading out the portion between the apexes of the two narrowed protrusions 82a, 82a. That is, at this time, a force is applied to a direction shown by the white outlined arrow direction spreading out the portion between the apexes of the two narrowed protrusions 82a, 82a, and corresponding to the force, an extra operating force for pivoting the armrest T is required.

In addition, at this time, in the present example, since the deformed hole 83 is formed close to the narrowed protrusion 82a, by deformation of the deformed hole 83, the force in the white outlined arrow direction can be absorbed, and therefore the bushing member 8 itself can be effectively prevented from being deformed. Moreover, the vicinity of the opposite narrowed protrusion 82a (the outer narrowed protrusion 82a) is bent to the outside, and thereby capable of letting out the force in the white outlined arrow direction. In addition, by forming a notch portion protruded to the inside in that position, the force in the white outlined arrow direction may be efficiently let out. Then, when the force is further applied, as shown in FIG. 13C, the stopper shaft 6d abuts one end portion (an upper end portion) of the communication hole between the stopper shaft moving hole 72 on the receiving member side and the stopper shaft moving hole 82 on the bushing member side, and the stopper shaft 6d is prohibited from further moving in the arrow direction. In addition, at this time, abutment of both of the apexes of the two narrowed protrusions 82a, 82a and the stopper shaft 6d is released, and the deformed hole 83 which was deformed is restored.

As thus described, in a process from FIG. 13B to FIG. 13C, an operating force of an operator is reduced to a small force from a large force. That is, in a step of FIG. 13B, since the force for spreading out the portion between the apexes of the two narrowed protrusions 82a, 82a is required, the operating force for pivoting the armrest T needs to be increased, and in a step of FIG. 13C, contact of the stopper shaft and both of the apexes of the two narrowed protrusions is released, and therefore the operating force is reduced. Thereby, an operator can recognize that a pivoting operation is finished. In other words, along with conversion into the small force from the large force, a response when the two narrowed protrusions 82a, 82a are restored to original positions can be felt, and a so-called "click feeling" can be recognized. Hence, in the usage position, further pivot of the stopper shaft 6d is prohibited, and displacement completion to the usage position can be surely recognized. It should be noted that, hereinabove, although the usage position has been described, description of the stored position is omitted because of similarity.

It should be noted that, although the above embodiments were described as particular examples, the present disclosure is not limited thereto, and the configuration, the arrangement, and the like of each member can be changed without departing from the scope of the present disclosure. For example, the shape of the narrowed protrusion 82a may be any shape such as a circular arc and a polygon, and the shape of the deformed hole 83 may also be any shape such as a circle and a polygon. Moreover, in the present example, although stop positions are provided at the stored position and the usage position, the present disclosure is not limited thereto, and if necessary, the stop position and a click feeling may be imparted by similarly providing the narrowed protrusion 82a in a halfway step or the like.

TABLE OF REFERENCE NUMERALS

S: Vehicular seat
K1: Cushion pad
K2: Skin material
   K21: Work hole on the skin material side (Work hole)
F: Seat frame
1: Seat back frame
  1a: Side frame on the seat back side
  1b: Upper frame
  1c: Center frame on the back side
  1d: Connecting frame
  H: Pillar support portion
2: Seat cushion frame
  2a: Side frame on the cushion side
  2b: Rear side coupling pipe
  2c: Front side upper portion coupling pipe
  2d: Front side lower portion coupling bar
  2e: Center frame on the cushion side
3: Coupling member
4: Lowe frame
5: Rail coupling member
T: Armrest
6: Armrest frame
  6a: Side frame on the armrest side
    601: Center side frame on the armrest side
    602: Other side frame on the armrest side
    61: Pivot center shaft through-hole
    62: Stopper shaft through-hole
  6b: Upper frame on the armrest side
  6c: Pivot center shaft (First shaft)
  6d: Stopper shaft (Second shaft)
G: Guide member
7: Armrest receiving member
  71: Pivot center shaft through-hole on the receiving member side (First hole)
  72: Stopper shaft moving hole on the receiving member side (Second hole)
    72b: Receiving wall on the stopper shaft through-hole side
8: Bushing member
  81: Pivot center shaft through-hole on the bushing member side (First hole)
    81a: Slit
    81b: Locking pawl on the center shaft through-hole side
  82: Stopper shaft moving hole on the bushing member side TABLE OF REFERENCE NUMERALS-continued (Second hole)
    82a: Narrowed protrusion
    82b: Locking pawl on the stopper shaft through-hole side
  83: Deformed hole
  D1: Plate member non-abutment portion
  D2: Plate member abutment portion
  D3: Stepped portion
9: Plate member
  9a: Outer extension portion
  91: Pivot center shaft through-hole on the plate member side (Third hole)
    91a: Slit on the plate member side
  92: Stopper shaft through-hole on the plate member side (Fourth hole)
  93: Incorrect assembly prevention hole
10: Spacer
  10a: Spacer slit
11: Reclining mechanism
H1: First communication hole (First hole)
H2: Second communication hole (Second hole)
M1: Member arrangement space

The invention claimed is:

1. A seat provided with an armrest which is pivotally displaced around one end side between a stored position where it is retracted in a posture along a seat back and a deployed position where it is deployed to a position where a free end side projects forwardly from the seat back, wherein:
on the one end side of the armrest, a first shaft configured as a pivot center is disposed to pass through in a width direction of the seat, and a second shaft passes through the one end side substantially parallel to the first shaft;
the first shaft is pivotably supported by a first hole formed in a guide member fixed to a seat back frame which is a framework of the seat back, and the second shaft is inserted into an elongated second hole formed along a partial circular arc locus around the first hole so as to be movable along the second hole;
between a side surface side of the armrest and the guide member, a plate member which covers at least a part of the second hole is provided;
the guide member includes a plate member abutment portion formed with the first hole and in face contact with the plate member, and a plate member non-abutment portion formed with the second hole;
the plate member abutment portion is brought into face contact with the plate member, and the plate member non-abutment portion does not abut the plate member.

2. The seat provided with the armrest according to claim 1, wherein at least a part of the guide member and at least a part of the plate member are brought into face contact.

3. The seat provided with the armrest according to claim 1, wherein the first shaft and the second shaft pass through the plate member and are fixed.

4. The seat provided with the armrest according to claim 3, wherein a third hole and a fourth hole are formed in the plate member, one of the first shaft and the second shaft is press-fitted and fixed to the third hole, and the other of the first shaft and the second shaft passes through the fourth hole perforated so as to have a larger diameter than a shaft outer diameter of the other of the first shaft and the second shaft.

5. The seat provided with the armrest according to claim 4, wherein the one of the first shaft and the second shaft is press-fitted into the third hole bored into a substantially square shape which is configured by a side length smaller than a shaft outer diameter of the one.

6. The seat provided with the armrest according to claim 5, wherein a slit extending in an outside direction is formed continuously to the third hole.

7. The seat provided with the armrest according to claim 1, wherein:
in a boundary portion between the plate member abutment portion and the plate member non-abutment portion, a stepped portion is formed;
a thickness of the plate member abutment portion is thicker on an inner side in the width direction of the seat in an assembled state than a thickness of the plate member non-abutment portion.

8. The seat provided with the armrest according to claim 1, wherein between the plate member and an armrest frame which is a framework of the armrest, a spacer member is interposed.

9. The seat provided with the armrest according to claim 8, wherein:
the armrest is configured by having i) two side frames on respective armrest sides of the armrest which are disposed separately in the width direction of the seat, and ii) an upper frame on an armrest side of the armrest which bridges upper ends of the two side frames; and
at least a part of a side frame of the two side frames that is located closer to where the plate member is provided is arranged to be offset towards an other side frame of the two side frames that is located further from the plate member.

10. The seat provided with the armrest according to claim 8, wherein:
the armrest is configured by having the armrest frame, a pad provided peripherally in the armrest frame, and a skin material which covers the pad;
in the skin material, a work hole which opens so as to expose a periphery of the first shaft is formed; and
the plate member is provided with an outer extension portion which extends in an outside direction than the work hole.

11. The seat provided with the armrest according to claim 1, wherein the armrest is provided on an inner side of the seat back frame in the width direction of the seat.

12. The seat provided with the armrest according to claim 1, wherein the seat is larger in a width direction than a semi-bench seat, and the plate member is provided on an inner side of the seat back frame in the width direction of the seat.

13. The seat provided with the armrest according to claim 1, wherein a slit is integrally provided toward an outer edge of the guide member from the first hole.

14. The seat provided with the armrest according to claim 1, wherein:
at both end portions of the second hole, narrowed protrusions having apexes toward an inner side of the second hole are formed; and
in the portions of the narrowed protrusions, the second hole is configured to be smaller in width thereof.

15. The seat provided with the armrest according to claim 14, wherein in the vicinity of the narrowed protrusions, a deformed hole configured to absorb an operating force applied when the second shaft passes the narrowed protrusions of the second hole is formed.

16. A seat provided with an armrest which is pivotally displaced around one end side between a stored position where it is retracted in a posture along a seat back and a deployed position where it is deployed to a position where a free end side projects forwardly from the seat back, wherein:
on the one end side of the armrest, a first shaft configured as a pivot center is disposed to pass through in a width direction of the seat, and a second shaft passes through the one end side substantially parallel to the first shaft;
the first shaft is pivotally supported by a first hole formed in a guide member fixed to a seat back frame which is a framework of the seat back, and the second shaft is inserted into an elongated second hole formed along a partial circular arc locus around the first hole so as to be movable along the second hole;
between a side surface side of the armrest and the guide member, a plate member which covers at least a part of the second hole is provided;
wherein at both end portions of the second hole, narrowed protrusions having apexes toward an inner side of the second hole are formed;
wherein in the vicinity of the narrowed protrusions, a deformed hole configured to absorb an operating force applied when the second shaft passes the narrowed protrusions of the second hole is formed.

17. The seat provided with the armrest according to claim 16, wherein at least a part of the guide member and at least a part of the plate member are brought into face contact.

18. The seat provided with the armrest according to claim 16, wherein:
the guide member includes a plate member abutment portion formed with the first hole and in face contact with the plate member, and a plate member non-abutment portion formed with the second hole;
in a boundary portion between the plate member abutment portion and the plate member non-abutment portion, a stepped portion is formed;
a thickness of the plate member abutment portion is thicker on an inner side in the width direction of the seat in an assembled state than a thickness of the plate member non-abutment portion; and
the plate member abutment portion is brought into face contact with the plate member, and the plate member non-abutment portion does not abut the plate member.

19. The seat provided with the armrest according to claim 16, wherein between the plate member and an armrest frame which is a framework of the armrest, a spacer member is interposed.

20. The seat provided with the armrest according to claim 16, wherein in the portions of the narrowed protrusions, the second hole is configured to be smaller in width thereof.

* * * * *